J. E. LEWIS.
GUN DEFLECTION ANGLE AND RANGE MEASURING INSTRUMENT.
APPLICATION FILED JULY 16, 1918.
1,409,303.
Patented Mar. 14, 1922.
4 SHEETS—SHEET 4.
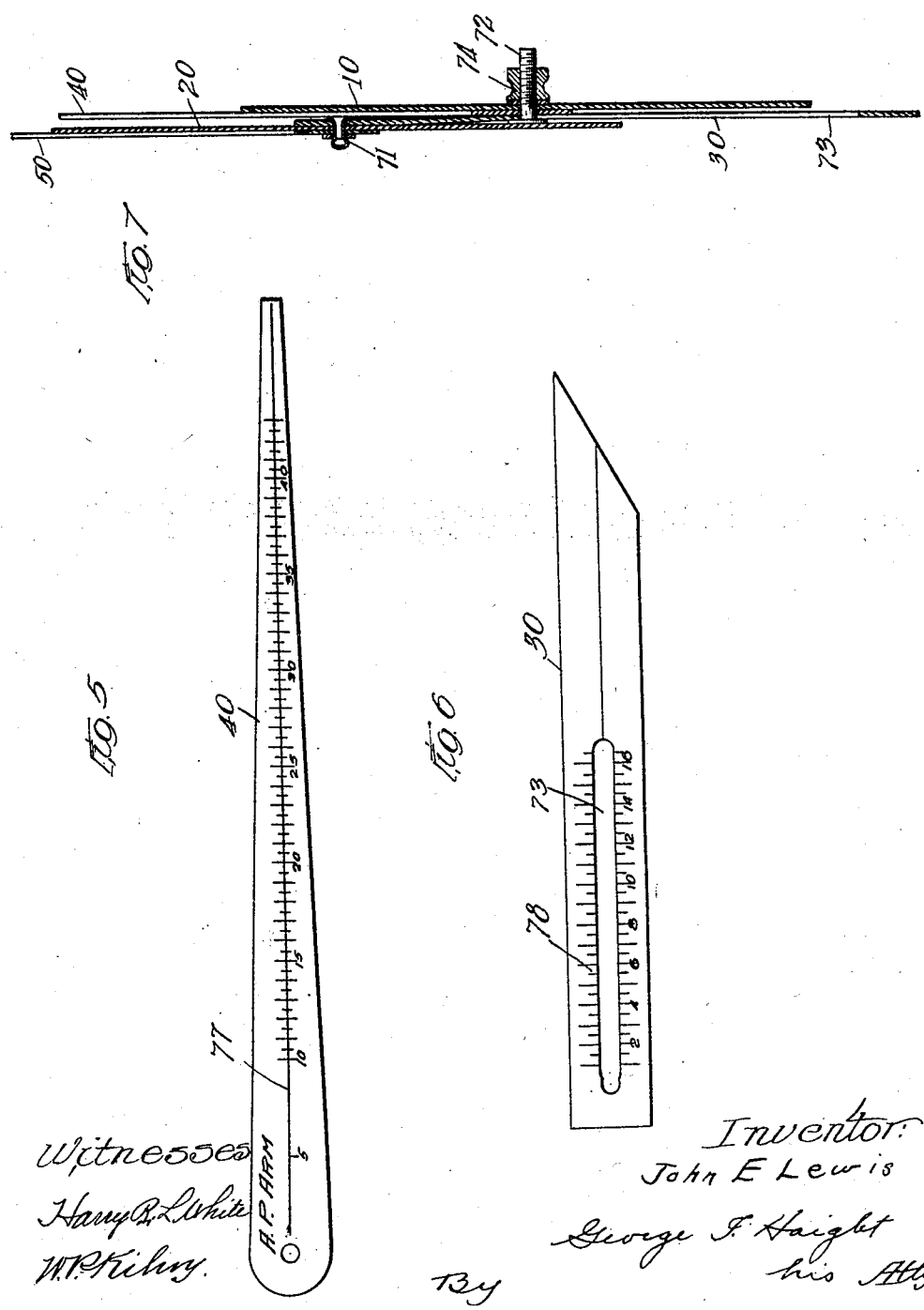

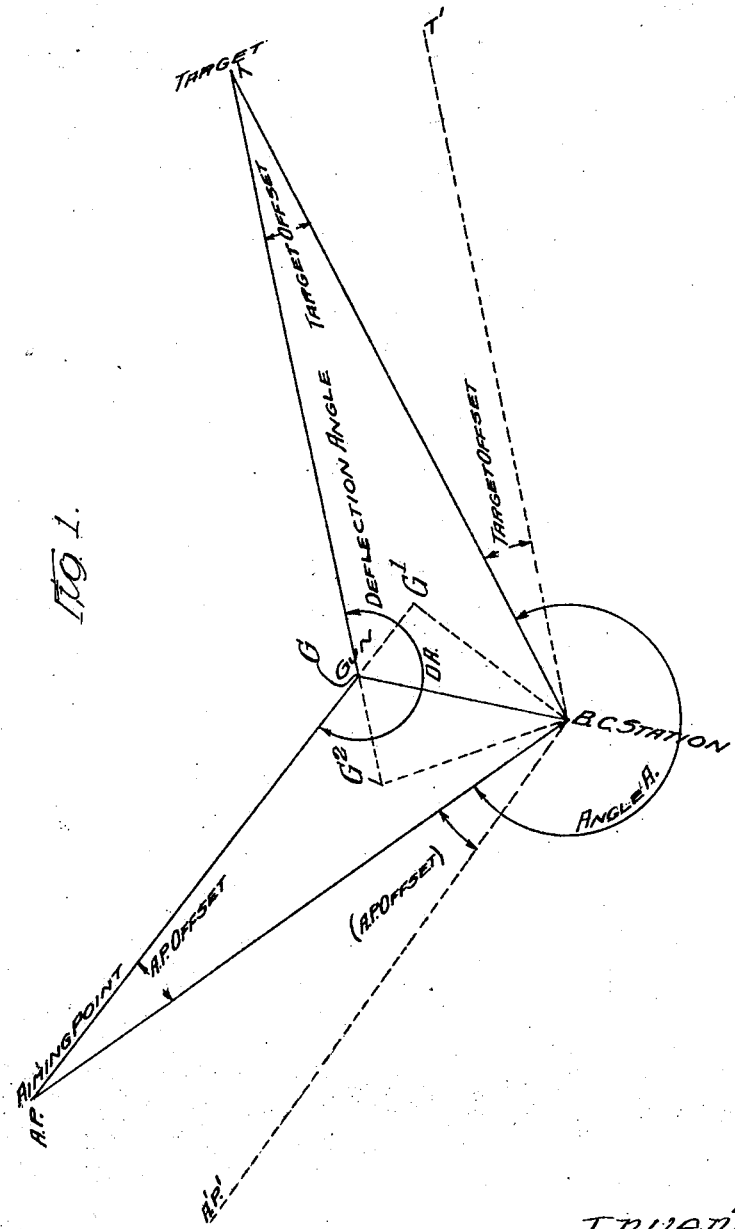

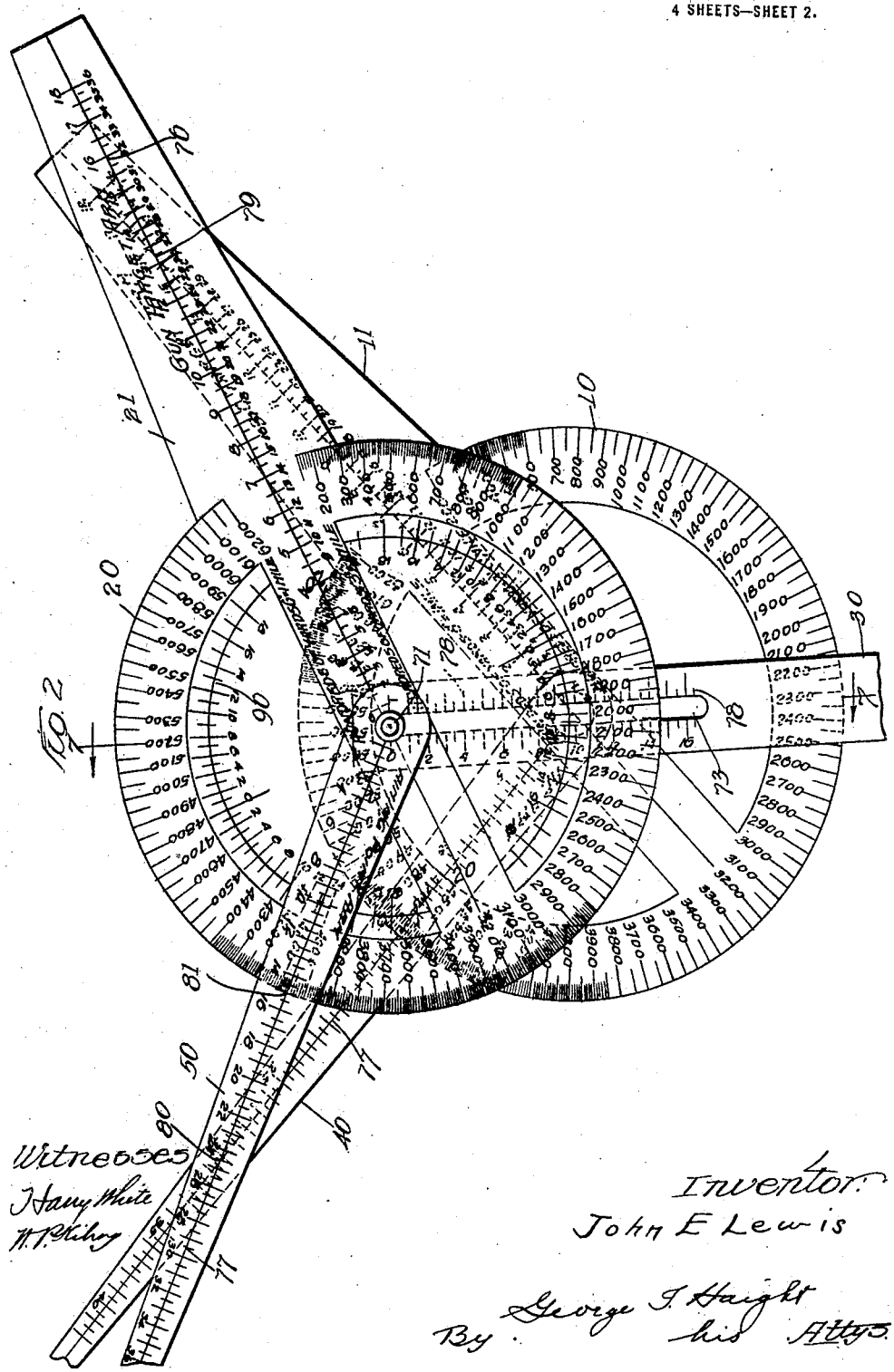

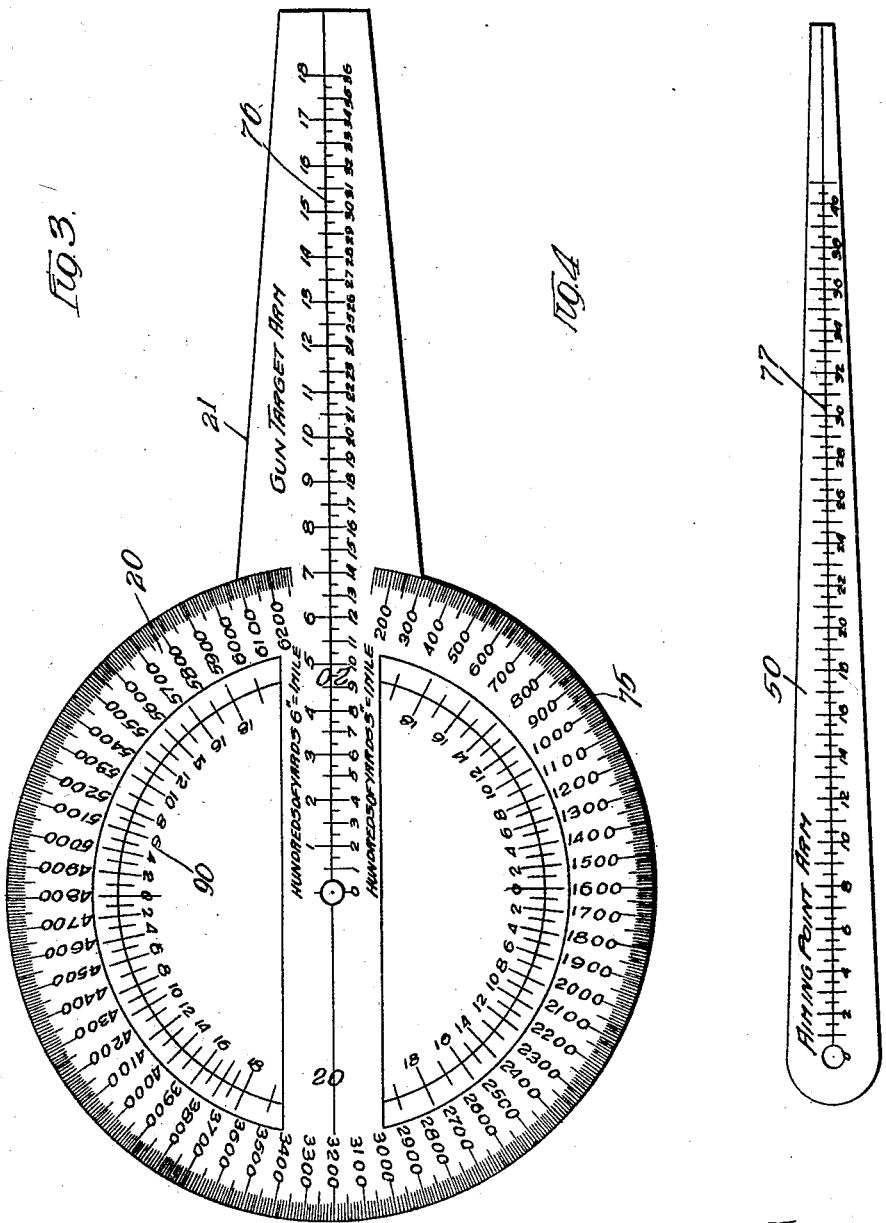

UNITED STATES PATENT OFFICE.

JOHN E. LEWIS, OF WHEATON, ILLINOIS.

GUN DEFLECTION-ANGLE AND RANGE MEASURING INSTRUMENT.

1,409,303.   Specification of Letters Patent.   Patented Mar. 14, 1922.

Application filed July 16, 1918.  Serial No. 245,181.

*To all whom it may concern:*

Be it known that I, JOHN E. LEWIS, a citizen of the United States, residing at Wheaton, in the county of Du Page and State of Illinois, have invented a certain new and useful Improvement in Gun Deflection-Angle and Range Measuring Instruments, of which the following is a full, clear, concise, and exact description, reference being had to the accompanying drawings, forming a part of this specification.

This invention relates to improvements in gun deflection angle and range measuring instruments.

At the present time, great difficulty is being experienced in calculating the so-called "deflection angle" and "range" for guns employed in artillery batteries. The present method involves a series of trigonometrical calculations and in numerous instances, the men and officers called upon to perform the necessary calculations are totally unfamiliar with trigonometry in any form. The result has been that the work of instruction has been much delayed and has proven unsatisfactory in many respects.

The object of my invention is to provide an instrument which will totally eliminate all the trigonometry and mathematical calculations now required under the present practice and whereby the required deflection angles and ranges for battery guns can be ascertained mechanically by anyone even totally unfamiliar with trigonometry, mathematics or any of the mathematics above arithmetic by merely setting various elements of my improved instrument in accordance with known factors.

In the drawing forming a part of this specification, Figure 1 is a diagrammatic view illustrating the present method of ascertaining the deflection angles and ranges for battery guns, as hereinafter explained in detail. Fig. 2 is a top plan view of my improved instrument for arriving at the same results heretofore calculated in the manner indicated by the diagrammatic view of Fig. 1. In Fig. 2, the instrument is set to determine the deflection angle and range in accordance with the same factors involved in the problem presented by Fig. 1. Fig. 3 is a plan view of one of the two protractors employed in my instrument. Fig. 4 is a plan view of one of the pivoted aiming-point-arms, the same being the one used directly in connection with the gun protractor. Fig. 5 is a view similar to Fig. 4 of the pivoted aiming-point-arm used directly in connection with the so-called "battery commander protractor." Fig. 6 is a top plan view of the so-called "gun arm." In Figs. 3, 4, 5 and 6, the various elements shown therein are illustrated detached. And Fig. 7 is a sectional view of the instrument taken substantially on the line 7—7 of Fig. 2.

In order to explain satisfactorily the method of using my improved instrument and the advantages arising therefrom, I deem it advisable to describe somewhat in detail the present manner of calculating the deflection angles and ranges for battery guns and will therefore consider first the showing of Fig. 1.

In actual artillery practice, under modern conditions, a battery generally consists of four guns placed in a line and spaced 20 yards apart. The direction in which the various guns of the battery are to be pointed is given to the gun operators or artillerymen in the form of a "deflection angle," by the commander of the battery. That is, each gun is provided with what may be called a base line or zero angle and the direction in which the gun is to be aimed is given to the artillerymen as so many degrees of deflection angle from the said base line. For instance, if the deflection angle is 120°, the artilleryman will swing his gun to a direction so that the angle between the line of direction and the first or base line will correspond to the deflection angle. It will be understood in this connection that suitable instruments are attached to the gun and the artilleryman is merely required to take his reading from the protractor or corresponding instrument attached to his gun. The range for the gun is set by means of another instrument attached to the gun in a manner which is well understood.

The battery commander is located at varying distances and at various angles to the rear of the gun and it is the duty of the battery commander, from the position which he occupies, to calculate the necessary deflection angle for the gun or all of the guns of the battery. It will, of course, be understood that the target at which the gun or guns are aimed is invisible to the gunners or artillerymen and the range cannot be calculated by them. The target either is visible to the battery commander or at least its direction is known to him from information available so that the angle A, that is, the angle between the line BC—AP and the line BC—T can be readily ascertained by means of a protractor and the distance of the target from the battery commander's position. Consequently, the problem of the battery commander is to ascertain by means of the facts known to him, the necessary deflection angle for each gun of his battery and range, which problem obviously involves numerous variable factors. These factors are the varying distances of the target from the battery commander's station; varying distances of each gun of the battery from the battery commander's station; variations in the angle or direction of the target from the battery commander's station; variations in the angle or direction of each gun of the battery from the battery commander's station; and the angle which the line of the four battery guns makes with respect to the direction or line to the target from each individual gun.

Referring to Fig. 1, the point BC or BC station, indicates the location or position of the battery commander. The target or T, indicates the location of the point or place which it is desired to shell. In this connection, it will be remembered that the target is invisible to the gunner or artilleryman. The gun or G, indicates the location of one of the guns under the command of the battery commander. The aiming point or A.P., indicates the location of either an object visible to both the battery commander and the gunners or is an assumed point for determining the zero or base line for each gun and from which zero or base line the deflection angles for the guns are measured. The problem, therefore, is for the battery commander to determine the deflection angle or DA arc indicated in Fig. 1. In figuring the deflection angle, the battery commander is assumed to know the direction of the line BC—T, the distance BC to T, the distance from BC to A.P. and the distance from BC to the gun G. The line BC—G' is an imaginary line representing the perpendicular distance from the battery commander's station to a line passing through the points A.P. and G. Similarly, the line BC—G² is perpendicular to the line passing through the points T and G. The line BC—A'.P'. is made parallel to the line A.P.—G' and the line BC—T' is made parallel to the line G—T.

In modern practice, the use of degrees, minutes and seconds for measuring the angles is avoided so far as possible and in lieu thereof the circumference of a circle is divided into 6400 parts and each part of the circumference is called a "mil." The mil is that angle which subtends one yard at a distance of 1000 yards from the center of the circle.

To determine the deflection angle DA, the battery commander proceeds as follows: He first ascertains the angle between the line G—AP and the line BC—A.P. or the "A.P. offset." This A.P. offset therefore equals the length of the line G'—BC divided by .001 of the length of the line BC—A.P., or, expressed mathematically, A.P. offset = $(G'—BC) \div \frac{1}{1000} (BC—A.P.)$ In a similar manner, the target offset angle, that is, the angle between the line BC—T and line G—T is ascertained, the formula reading as follows:

Target offset = $(G^2—BC) \div \frac{1}{1000} (BC—T)$

In both instances it will be understood that the offset angles are readable in mils, all distances being figured in yards. As will be evident, the angle between the line A'P'—BC and the line BC—AP equals the angle between the line BC'—AP and the line AP—G' since the lines BC—A'P' and G'—AP are parallel. Similarly, the angle between the line BC—T' and the line BC—T equals the angle between the lines BC—T and T—G². Knowing the angle A, as heretofore explained, the deflection angle for the gun at G is equal to the angle A minus the sum of the two offset angles or, expressed mathematically, Deflection angle =
 Angle A—(A.P. offset + target offset)

The deflection angle having thus been determined the information is transmitted to the gunner or artilleryman so that his gun can be correctly pointed.

The next problem involves the calculation of the range or distance from the gun to the target and this necessitates employment of the rightangle triangle T—BC—G². This in turn necessitates determination of the so-called "obliquity factor" or angle between the line G—BC and the line BC—G². A similar calculation is employed in determining the distance G—A.P. To ascertain the distance G'—BC, (if the same is not taken purely as an estimate) the battery commander employs the trigonometrical function which requires the multiplying of the distance G'—BC by the cosine of the angle between the line G—BC and the line G'—BC. Similarly with determining the length of the line BC—G².

From the foregoing, it will be seen that numerous calculations are involved, the chances of error are frequent, and in the case of those officers not entirely familiar with trigonometry, the number of angles and triangles with overlapping formations render the calculations unusually confusing. Furthermore, the determination of the deflection angle and range above described applies to only one gun of the battery and after this is ascertained, it is necessary to calculate the "deflection difference" for each individual gun of the battery since it is evident that the spacing apart of the guns of the battery will change the deflection angle.

Referring now to the instrument illustrated in Figs. 2 to 7, 10 denotes a protractor having the circumference thereof graduated in mils, said protractor having a center corresponding to the location of the BC station; 20 designates another protractor similarly graduated and the center of which is designed to correspond with the position G of the gun; 30 designates an intermediate arm pivotally connected to the gun protractor 20 and slidably adjustable with respect to the center of the BC protractor 10; 40 designates an aiming point arm pivoted at the center of the BC protractor 10; and 50 designates another aiming point arm pivotally attached to the gun protractor 20 at its center. In addition to the foregoing, the BC protractor 10 is formed with an integral target arm 11 and the gun protractor 20 is provided with a corresponding gun target arm 21.

All of the parts are shown as preferably formed of celluloid or other suitable material having the necessary rigidity and preferably transparent inasmuch as the protractors and arms will overlie each other more or less, depending upon the various problems being solved. The gun aiming point arm 50, the gun protractor 20, and the intermediate arm 30 are all pivotally connected by any suitable means at the center of the gun protractor, as for instance, by an eyelet 71, shown most clearly in Fig. 7. At the center of the BC protractor 10 is provided a headed screw 72 passing through the elongated slot 73 formed in the intermediate arm 30 (see Figs. 6 and 7). On the under side of the screws 72 is provided a preferably knurled tightening nut 74.

Each protractor is provided with a peripheral scale indicating arcs or angles from the center of the protractor, as clearly indicated at 75 in Fig. 3. In addition, each of the protractors 10 and 20 is provided on its target arm with a lineal scale, as indicated at 76 in said Fig. 3. This scale 76 is provided on a radius extending from the center of the protractor and the zero reading is at the center of the protractor. As shown in Fig. 3, the scale 76 is double, one reading hundreds of yards when the scale is 3" to the mile, and the other hundreds of yards when the scale is 6" to the mile. It will also be observed that the zero reading of the protractor coincides with the scale line 76, as clearly shown in Fig. 3.

Each of the aiming point arms, shown in Figs. 4 and 5, is also provided with a lineal scale, as indicated at 77. The zero on these scales 77 is at the pivotal point of the arms and these scales are also in yards or hundreds of yards, as on the target arms of the protractors.

The intermediate arm 30 which is pivotally connected to the gun protractor and slidably connected to the BC protractor, has a lineal scale extending lengthwise of the slot 73, as clearly indicated at 76 in Fig. 6, the zero point on the scales 78 corresponding to the pivotal connection of the arm 30 with the gun protractor 20. The scale 78 is also in yards to correspond with the other lineal scales.

In solving a problem with my improved instrument, the center of the BC protractor 10 is taken as the battery commander's station and the target arm 11 thereof is arranged to correspond to the direction of the target from the station. The aiming point arm 40 is then swung to correspond with the line from the battery commander's station to the aiming point, or, in accordance with the so-called angle "A," hereinbefore referred to in connection with Fig. 1. The gun protractor 20 is then shifted so that the center thereof corresponds to the position of the gun with respect to the BC station. That is, the center of the protractor 20 is adjusted for the distance from the BC station by means of the lineal scale 78 on the arm 30 and swung so that the angle of the line between the BC station and the gun is in accordance with the actual conditions. When the target arm 11, aiming point arm 40 and center of the protractor 20 are adjusted as above indicated, the nut 74 is tightened so as to hold the parts in their adjusted position.

The calculator then takes a point on the target arm 11 which corresponds on the lineal scale 76 to the distance of the target from the BC station, as for instance, at the point indicated at 79 in Fig. 2. This reading, of course, is obtained direct on the target arm 11. The gun target arm 21 is then swung so that the lineal scale 76 thereon crosses the lineal scale of the BC target arm 11 at the point 79. In this way, it is evident that a direct reading of the distance from the gun to the target is obtainable on the scale 76 of the gun target arm 21. The calculator next swings the aiming point arm 50 pivoted to the gun protractor until the lineal scale 77 thereon crosses a point, as for instance 80, on the BC target arm 40, which point 80 corresponds to the distance of the aiming point from the BC station. With the parts thus adjusted, it is evident that the distance from the gun to the aiming point 80 is directly readable on the scale of the aiming point arm 50. It is also evident that with the two aiming point arms 40 and 50 and the two target arms 11 and 21 set in accordance with the foregoing description, the angle between the gun target arm and the gun aiming point arm will be directly readable in mils (or degrees) on the gun protractor 20, the reading being taken as indicated at the point 81 in Fig. 2. This gives a direct reading for the deflection angle for the gun and it is obvious that the entire problem is solved mechanically merely by suitably adjusting the various parts of the instrument.

In order to obtain the so-called "deflection difference" for the other guns of the battery in addition to the one determined as aforesaid, I have provided on the gun protractor 20 an additional degree or arc scale indicated at 90 in Fig. 3. This scale is divided into quadrants and the zero points are in a line perpendicular to the line of the gun target arm and passing through the center of the protractor. The scale 90 reads from zero in each direction for 90°, as clearly indicated in Fig. 3. To obtain the deflection difference for the other guns of the battery, the reading which the aiming point arm 50 makes with the scale 90 is taken and divided by (.001 × distance from gun to A.P.). It will be evident that this last result is obtained without changing the setting of the instrument and saves a very large amount of calculation and time.

From the preceding description, it will be seen that my instrument does mechanically what has heretofore required considerably involved calculations with consequent saving of time and labor. In addition, the instrument is such that errors arising from confusion are practically eliminated since the exact arrangement of the gun, BC station, target, and aiming point are clear to the eye on the instrument and the overlapping of triangles. etc.. is completely avoided. In addition, it is evident that the instrument is adjustable to calculate the deflection angles under all variations of distances and angles and a direct reading for each gun is obtained, both for the deflection angle and the range. It will be noted that my instrument eliminates all necessity for calculating the target and aiming point "offsets" heretofore referred to for correcting the angle A; eliminates the necessity of calculating the "obliquity" factor hereinbefore referred to; insures greater accuracy in figuring the deflection angle on account of the target and aiming point offsets and obliquity factors being taken care of automatically in the setting of the instrument; and eliminates the necessity for figuring the obliquity of the battery line with the aiming point line and the distance between guns.

The device is exceedingly simple; can be readily understood by any man with fair intelligence whether or not he is familiar with geometry or trigonometry; the instrument is small and compact (the drawing showing the device substantially in full size) and the instrument can be manufactured in large quantities at comparatively small expense. The size and nature of the instrument is also such that it can be readily included in the kit of all artillerymen and is of especially great benefit in the teaching of figuring firing data which is now so essential in the training of the army.

Although I have herein shown and described what I now consider the preferred manner of carrying out my invention, the same illustrates merely one embodiment of the invention and I do not intend to be confined to the specific arrangement shown in the drawing inasmuch as it is evident that various changes and modifications may be made without departing from the spirit of the invention.

What I claim is:

1. In an instrument of the character described, the combination with two protractors having their centers adjustable relatively to each other, of a pair of radially arranged arms associated with each protractor, one arm associated with each protractor being fixed therewith and locating the zero point on the protractor scale, said other arms being angularly adjustable with respect to the remaining arms.

2. In an instrument of the character described, the combination with two transparent, mil-protractors having their centers adjustable relatively to each other, of a pair of transparent radial arms marked with distance scales associated with each protractor, the arms of each pair being angularly relatively adjustable, the scale of one arm being readable through a superposed arm.

3. In a device of the character described, the combination with a target arm and an aiming point arm, said arms being angularly relatively adjustable about a center corresponding to one station; of another set of target and aiming point arms also relatively angularly adjustable about another center corresponding to another station, the relative positions of said centers being also adjustable.

4. In a device of the character described, the combination with a target arm and an aiming point arm, said arms being angularly relatively adjustable about a center corresponding to one station; of another set of target and aiming point arms also relatively angularly adjustable about another center corresponding to another station, the relative positions of said centers being also adjustable; and means for reading the angle between each set of arms.

5. In a device of the character described, the combination with a target arm and an aiming point arm, said arms being angularly relatively adjustable about a center corresponding to one station; of another set of target and aiming point arms also relatively angularly adjustable about another center corresponding to another station, the relative positions of said centers being also adjustable; and means for scaling the distance from said centers to points on the respective arms associated therewith.

6. In a device of the character described, the combination with a target arm and an aiming point arm, said arms being angularly relatively adjustable about a center corresponding to one station; of another set of target and aiming point arms also relatively angularly adjustable about another center corresponding to another station, the relative positions of said centers being also adjustable; means for indicating the angle between each set of arms; and means for scaling the distance from said centers to points on the respective arms associated therewith.

7. In an instrument of the character described, the combination with a member having a protractor scale thereon, an arm extending radially from said member and indicating the zero point on the scale, and a second arm pivotally connected with said member at the center of the protractor scale; of a second member having a protractor scale and two arms similar to the arms of the first named protractor; said two members being relatively adjustable.

8. In a device of the character described, two protractors, each protractor having associated therewith a relatively fixed, radially extending arm corresponding to the zero point on the protractor scale and another radially extending arm pivotally attached thereto, each of said arms having a lineal scale thereon with the zero point corresponding to the center of the protractor; and means for adjusting said protractors relatively to each other.

9. In a device of the character described, the combination with two protractors, each having a pair of radially extending arms associated therewith, said arms being relatively angularly adjustable; of an intermediate arm pivotally connected to the center of one of said protractors and adjustably slidably connected with the center of the other of said protractors, said intermediate arm having also a lineal scale thereon indicating the distance between centers of the protractors.

10. In a measuring instrument of the character described, the combination with means having a point thereon corresponding to a station; means associated therewith to indicate both the angular directions and distances of a target and an aiming point with respect to the first named point; of means adjustable relatively to the first named point and having a point thereon corresponding to a gun station; and means, associated with the last named means, to indicate both the angular direction and the distance of said target and aiming points with respect to the point corresponding to said gun station.

11. In an instrument of the character described, the combination with two protractors having their centers adjustable relatively to each other, of a pair of radial arms associated with each protractor, the arms of each pair being angularly relatively adjustable, one of said protractors having also an additional scale indicating differences in deflection angles.

12. In a deflection angle measuring instrument, the combination with a protractor having a pair of radial arms associated therewith and angularly relatively adjustable; of a second protractor having similar arms associated therewith, said second protractor being provided with an additional angle measuring scale.

In witness that I claim the foregoing I have hereunto subscribed my name this 2nd day of July, 1918.

JOHN E. LEWIS.

Witnesses:
 JOSEPH F. YATES,
 CHARLES REMINE.